W. A. MACK.
Feeding Device for Sewing Machines.
No. 43,514. Patented July 12, 1864.
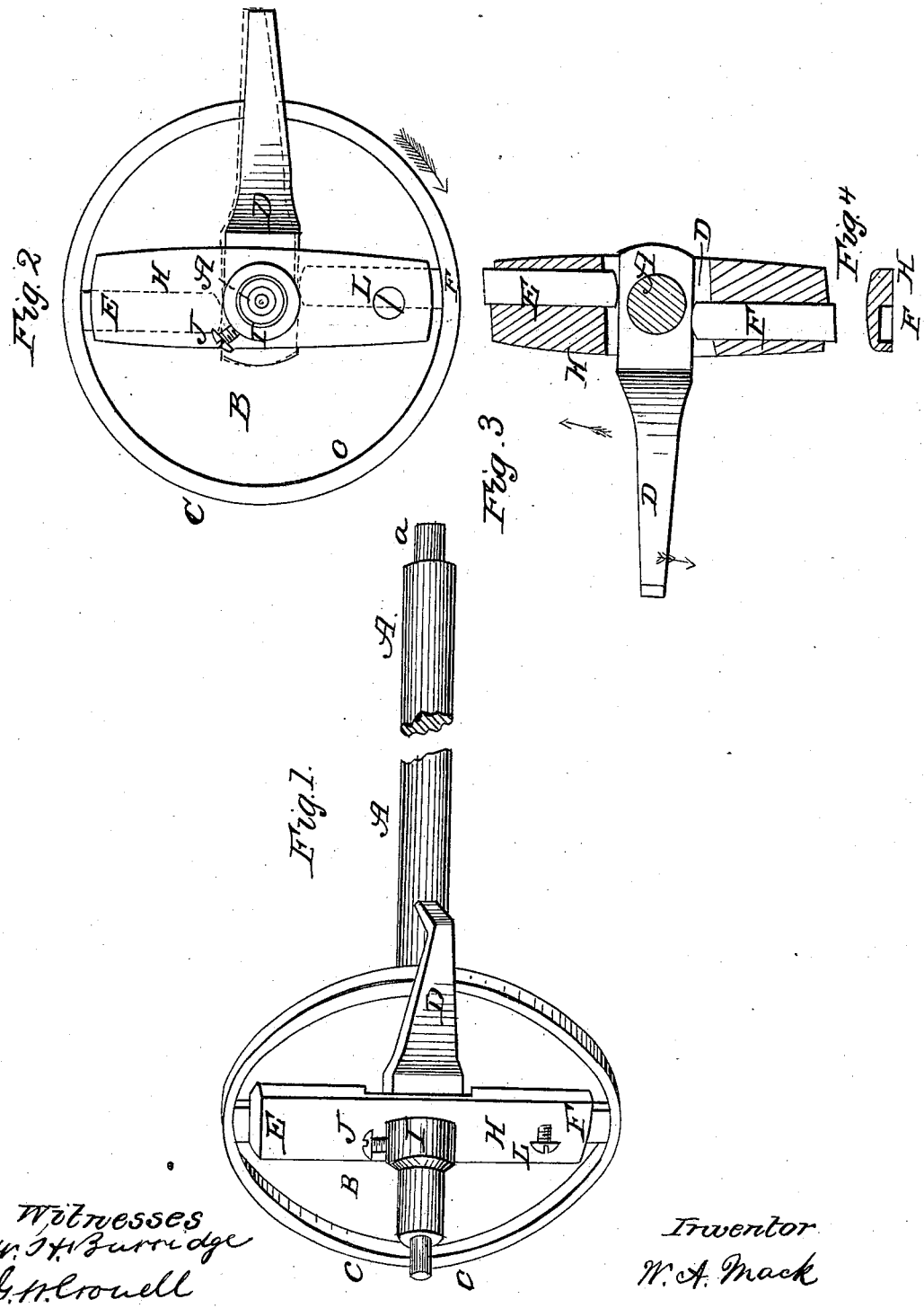
Witnesses
W. H. Burridge
G. H. Crowell
Inventor
W. A. Mack

UNITED STATES PATENT OFFICE.

W. A. MACK, OF CLEVELAND, OHIO.

IMPROVEMENT IN FEEDING DEVICES FOR SEWING-MACHINES.

Specification forming part of Letters Patent No. 43,514, dated July 12, 1864.

*To all whom it may concern:*

Be it known that I, W. A. MACK, of Cleveland, in the county of Cuyahoga and State of Ohio, have invented a new and Improved Feeding Device for Sewing-Machines; and I do hereby declare that the following is a full and complete description of the construction and operation of the same, reference being had to the accompanying drawings, making a part of this specification, in which—

Figure 1 is a perspective view. Fig. 2 is an end view. Fig. 3 represents a detached section. Fig. 4 represents a transverse section of Fig. 3.

Like letters of reference indicate like parts in the different views.

My invention relates to an improved feeding device for sewing-machines that will produce a positive and uniform movement of the feeding apparatus.

In the figures A is the shaft that connects he primary and secondary feeding-wheels of machine, it being designed to put the othed or roughed wheel on the journal $a$ at ne end of the shaft, the wheel C, which conrols its motions, being on the other end, as represented.

C' is a rim projecting over the side B of the wheel, and on this side are arranged the devices for operating the wheel, which are as follows:

D is an arm or lever on the shaft, fitting close to the side of the wheel, being curved outward over the rim C', and bent at the end, as shown in Fig. 1. This lever is designed to be connected with the feeding-cam of the machine and operated by it in any desired manner.

H is an arm or cap on the shaft, placed over the lever D and the slides E F. These slides fit into slots on the under side of the cap H, as indicated in Fig. 2 and represented in Fig. 3, which is a view of the under side of the arm D and cap facing the wheel. It will be observed that these slides are on opposite sides of the center of the shaft, being straight in their position across the wheel on different sides of the cap, extending from the rim C' to the sides of the lever.

D' is a slot on the under side of the cap for the lever to move in. When the cap is in its position on the wheel, by pressing on the end of the lever, moving it in the direction of the arrow in Fig. 3, the shaft acting as a fulcrum and the slides E and F being against each arm of the lever at an equal distance from the center, it follows that the slides would be pushed out and tightened against the rim of the wheel, and the wheel would move with the lever in that direction. By reversing the motion of the lever the slides are loosened, as indicated by the dotted lines in Fig. 2, and the cap with the slides move back the desired distance on the side of the wheel.

I is a ferrule on the shaft to keep the cap in place, being adjusted and secured in the desired place by the screw J.

The action of the feed-cam on the lever D tightens the slides, as described, moving the feeding-wheel C in the desired manner, the lever with the cap and slides being drawn back on the sides of the wheel by means of a spring attached to the screw L and connected with the machine, the length of the stitch being controlled or adjusted by any suitable device. The primary wheel is in direct contact with the cloth, having a roughened surface for carrying the fabric along.

What I claim as my improvement, and desire to secure by Letters Patent, is—

The slides E F and cap H, in combination with the lever D and rimmed wheel C, when arranged and operating conjointly, as and for the purpose set forth.

W. A. MACK.

Witnesses:
W. H. BURRIDGE,
G. W. CROWELL.